United States Patent [19]

Mehnert

[11] Patent Number: 5,433,141

[45] Date of Patent: Jul. 18, 1995

[54] DEVELOPMENT OF A UNIFORM TEMPERATURE GRADIENT IN A BLOCK OF CHEESE

[75] Inventor: David W. Mehnert, Antioch, Ill.

[73] Assignee: Kraft Foods, Inc., Northfield, Ill.

[21] Appl. No.: 44,964

[22] Filed: Apr. 8, 1993

[51] Int. Cl.$^6$ ............................................. A23C 3/02
[52] U.S. Cl. ............................... 99/453; 99/470; 165/61
[58] Field of Search ............... 99/453, 452, 455, 470, 99/467; 165/61; 62/457.1

[56] References Cited

U.S. PATENT DOCUMENTS

| | | | |
|---|---|---|---|
| 276,590 | 5/1883 | Irish | 62/457 |
| 3,402,569 | 9/1968 | Myers | 62/371 |
| 3,762,465 | 10/1973 | Gutlhuber | 165/61 X |
| 3,888,303 | 6/1975 | Skala | 165/61 X |
| 4,300,356 | 11/1981 | Notaro et al. | 62/457 X |
| 4,321,860 | 3/1982 | Hazen | 99/453 |
| 4,386,703 | 6/1983 | Thompson et al. | 165/61 X |
| 4,388,813 | 6/1983 | Gardner et al. | 62/457 |
| 4,509,587 | 4/1985 | Clark et al. | 165/61 |
| 4,941,527 | 7/1990 | Toth et al. | 165/61 |
| 5,176,203 | 1/1993 | Larzul | 165/61 |
| 5,309,987 | 5/1994 | Carlson | 99/470 |

Primary Examiner—David A. Scherbel
Assistant Examiner—Patrick F. Brinson
Attorney, Agent, or Firm—Fitch, Even, Tabin & Flannery

[57] ABSTRACT

The present invention is directed to a method and apparatus for developing a uniform temperature gradient in a block of cheese. The apparatus includes a chamber for receiving a cheese block. The chamber has a uniform cross section and has opposed openings separated by the length of the chamber. The chamber is surrounded by insulation on the peripheral surface between the openings. A heat exchange surface is disposed over and closes one of the openings. A second heat exchange surface is disposed over and closes the other of the openings. The temperature of the two heat exchange surfaces are different. When a block of cheese is disposed within the chamber, a temperature gradient can be established in the block of cheese in a relatively short period of time. Thereafter, the cheese block can be sliced into appropriate sections for determining moisture content as a function of cheese temperature.

3 Claims, 1 Drawing Sheet

DEVELOPMENT OF A UNIFORM TEMPERATURE GRADIENT IN A BLOCK OF CHEESE

FIELD OF THE INVENTION

The present invention is directed to a method and apparatus for developing a uniform temperature gradient in a block of cheese.

BACKGROUND OF THE INVENTION

It is common practice in the manufacture of cheddar and like types of cheese to produce the cheese in large blocks which are cooled from the manufacturing temperature of about 85° F. to a refrigerated temperature of about 40° F. Cheddar cheese, for example, is often produced in 640 pound blocks. Such large blocks of cheese take several days to cool from the manufacturing temperature of 85° F. to the cold room temperature of about 40° F. During the cooling period, a moisture gradient is established in the cheese. It has been found that there is a direct relationship between the quality throughout a block of cheese and the moisture gradient which is established in the cheese. It has been speculated that the moisture gradient is a function of the cooling rate and the temperature gradient which is established during the cooling period.

It would be desirable to provide a method for studying the relationship of moisture and the temperature gradient throughout a block of cheese. It is not practical, however, to investigate the temperature gradient and moisture gradient in a large block of cheese. Consequently, the present invention is directed to a method and apparatus for developing a uniform temperature gradient in a relatively small block of cheese and investigating the function of the temperature gradient and the moisture gradient in a block of cheese.

SUMMARY OF THE INVENTION

Figure 1:
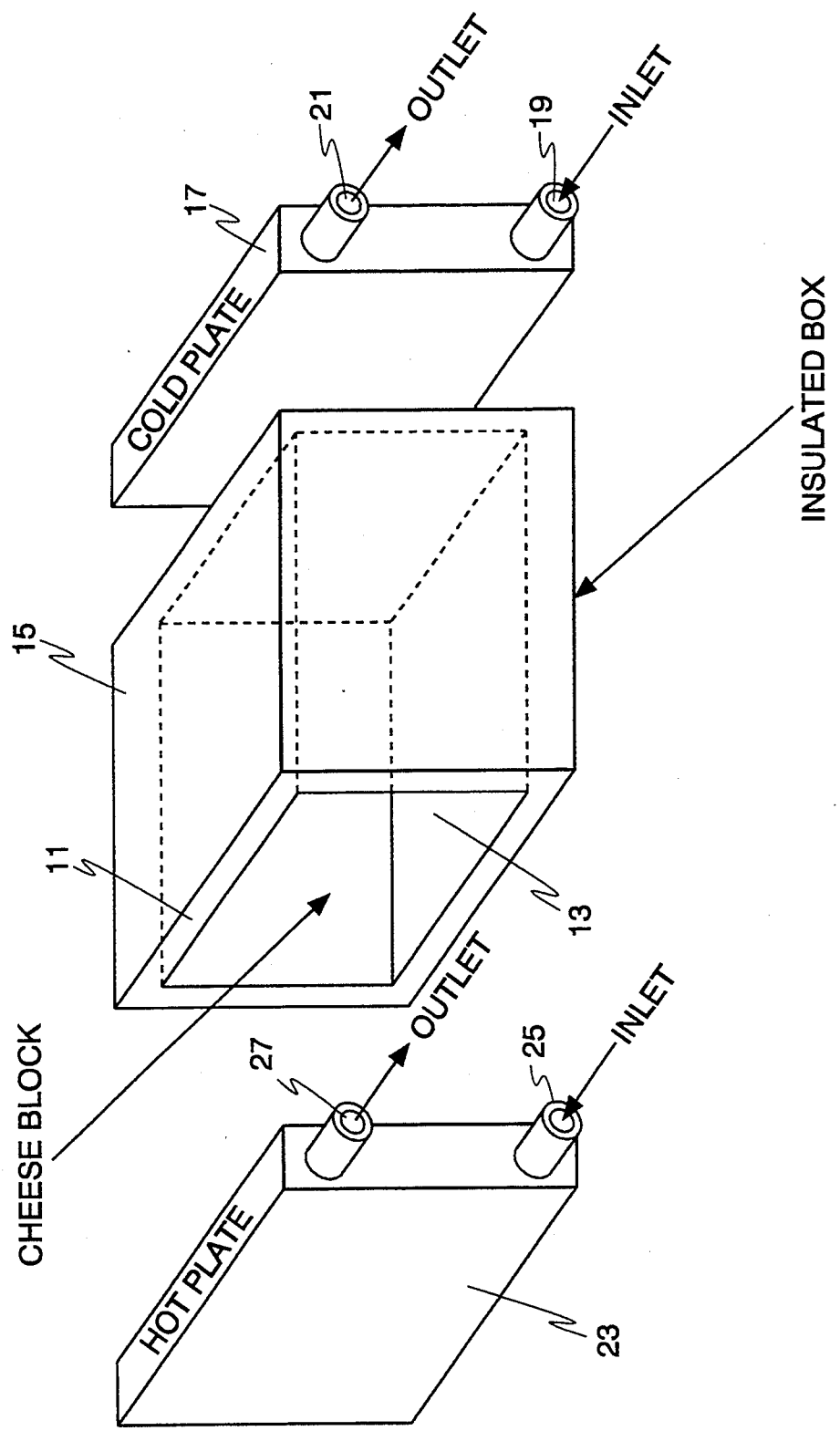
FIGURE 1 is a schematic diagram of the apparatus of the present invention for establishing a uniform temperature gradient in a block of cheese.

The present invention is directed to a method and apparatus for developing a uniform temperature gradient in a block of cheese. The apparatus includes a chamber for receiving a cheese block. The chamber has a uniform cross section and has opposed openings separated by the length of the chamber. The chamber is surrounded by insulation on the peripheral surface between the openings. A heat exchange surface is disposed over and closes one of the openings. A second heat exchange surface is disposed over and closes the other of the openings. The temperature of the two heat exchange surfaces are different. When a block of cheese is disposed within the chamber, a temperature gradient can be established in the block of cheese in a relatively short period of time. Thereafter, the cheese block can be sliced into appropriate sections for determining moisture content as a function of cheese temperature.

DETAILED DESCRIPTION OF THE INVENTION

As shown in FIGURE 1, the apparatus of the invention includes a housing 11 which defines a chamber 13 which is open at both ends. The periphery of the housing 11 between the two open ends of chamber 13 is covered with insulation 15. Heat exchanger 17 covers and closes one of the openings of chamber 13. Heat exchanger 17 is provided with an inlet connection 19 and an outlet connection 21 for circulating a heat exchange fluid, such as water, at a predetermined temperature throughout the heat exchanger 17. A heat exchanger 23 is located over and closes the other opening of chamber 13. Heat exchanger 23 is also provided with inlet connection 25 and an outlet connection 27 for circulating a heat exchange fluid, such as water, at a predetermined temperature. The temperature of heat exchanger 17 and heat exchanger 23 will be generally in the range of from about 5° to about 50° C. with a temperature differential between the two heat exchangers at a level of from about 10° C. to about 45° C.

The size of the chamber 13 can be any convenient size. It has been determined that a cube shape is preferable, although rectangular and cylindrical shapes can also be used. In general, the length of chamber 13 will be from about 4 to about 12 inches and the cross-sectional area of chamber 13 will be from about 8 to about 40 square inches. A requirement for chamber 13 is that the chamber have a uniform cross-section throughout the length between the two heat exchangers, although the cross section can be obloid, circular, rectangular or square.

The cross section of a cheese block placed into chamber 13 should have the same cross-section as that of the chamber. In general, for ease of insertion, the cross-section of the cheese block should be from about 1% to about 5% less than the cross-section and substantially fill the chamber 13. The length of the cheese block should equal to chamber 13 length.

After the cheese block is placed in chamber 13, the heat exchanger 17 is placed over one opening and heat exchanger 23 is placed over the second opening. A uniform temperature is established in each of the heat exchangers and the cheese block is permitted to reach a uniform temperature gradient. It will usually require from about 2 to about 10 days for the cheese block to reach a uniform temperature gradient. The cheese block is then removed from chamber 13, slices are cut from the cheese block at uniform intervals and the slices are analyzed for moisture content. The size of the cheese slices which are cut from the cheese block for moisture analysis will generally be in the range of from about $\frac{1}{8}$ inch to about $\frac{1}{4}$ inch.

The following example further illustrates various features of the invention but is intended to in no way limit the scope of the invention as set forth in the appended claims.

EXAMPLE 1

A housing was constructed in the shape of an open ended cube having a 5.25 inch length in all directions. The housing was covered with 2 inches of styrofoam insulation around the periphery of the housing between the two open ends. A 5 inch cubic block of cheddar cheese was placed in the chamber. A heat exchanger was placed over each of the openings of the chamber. The cold side heat exchanger was maintained at a temperature of 7.5° C. by circulation of water at that temperature through the heat exchanger. The hot side heat exchanger was maintained at a temperature of 46° C. After 2 hours, the cheese surface temperature on the cold side was 14° C. and the temperature of the cheese surface on the hot side was 30° C.

After the cheese blocks had reached a uniform temperature gradient, and exposure to the temperature gradient, for 3 days, the cheese block was removed from the chamber and sliced into ⅛ inch slices to provide 40 slices. The cheese slices were analyzed for moisture. The following Table 1 sets forth the results of this analysis.

TABLE 1

| Slice # | Moisture | | Temperature | |
|---|---|---|---|---|
| | Trial No. 1 | Trial No. 2 | Trial No. 1 | Trial No. 2 |
| 1 | 47.5 | 45.6 | 14° C. | 14° C. |
| 7 | 47.3 | 45.5 | 16° C. | 17° C. |
| 13 | 46.5 | 44.8 | 20.5° C. | 20° C. |
| 20 | 45.8 | 44.5 | 23° C. | 22° C. |
| 27 | 45.5 | 43.4 | 27.5° C. | 27° C. |
| 33 | 45.3 | 42.6 | 29° C. | 28.5° C. |
| 40 | 45.1 | 42.4 | 30° C. | 30° C. |

What is claimed is:

1. Apparatus for developing a uniform temperature gradient in a block of cheese comprising a chamber for receiving a cheese block, said chamber having a uniform cross-section and said chamber having opposed openings for receiving a cheese block insulation surrounding said chamber on the peripheral surface between said openings, a first planar heat exchanger surface disposed over and closing one of said openings and a second planar heat exchange surface disposed over and closing the other of said openings, the temperature of said first heat exchange surface being different than the temperature of said second heat exchange surface so as to provide a temperature gradient in said chamber, at least one of said first and second planar heat exchangers being removable to facilitate insertion of said cheese block into said chamber, said cheese block having a cross section substantially the same as that of said chamber and from about 1% to about 5% less than said chamber and the length of said cheese block being substantially equal to the length of said chamber.

2. Apparatus in accordance with claim 1 wherein the cross-section of said chamber is from about 16 to about 100 square inches.

3. Apparatus in accordance with claim 1 wherein the length of said chamber is from about 4 to about 10 inches.

* * * * *